United States Patent [19]

Giannuzzi

[11] Patent Number: 4,668,144
[45] Date of Patent: * May 26, 1987

[54] NON-ROTATING TOGGLE BOLT ASSEMBLY

[76] Inventor: Louis N. Giannuzzi, 4 Shelter Dr., Cos Cob, Conn. 06807

[*] Notice: The portion of the term of this patent subsequent to Oct. 14, 2003 has been disclaimed.

[21] Appl. No.: 815,812

[22] Filed: Jan. 2, 1986

Related U.S. Application Data

[63] Continuation-in-part of Ser. No. 635,068, Jul. 27, 1984, Pat. No. 4,616,968.

[51] Int. Cl.$^4$ ............................................. F16B 21/00
[52] U.S. Cl. ................................................... 411/342
[58] Field of Search ............... 411/342, 340, 341, 343, 411/344, 345, 346, 347, 15

[56] References Cited

U.S. PATENT DOCUMENTS

| | | | |
|---|---|---|---|
| 2,061,634 | 11/1936 | Pleister | 411/342 |
| 3,513,746 | 5/1970 | Forsberg | 411/346 |
| 3,946,636 | 3/1976 | Grey | 411/346 |
| 4,432,683 | 2/1984 | Polos | 411/340 |
| 4,478,545 | 10/1984 | Mizusawa | 411/57 |
| 4,579,492 | 4/1986 | Kazino | 411/60 |

FOREIGN PATENT DOCUMENTS

| | | | |
|---|---|---|---|
| 130259 | 11/1948 | Australia | 411/346 |
| 1237386 | 3/1967 | Fed. Rep. of Germany | 411/342 |
| 544088 | 3/1942 | United Kingdom | 411/346 |
| 1187837 | 4/1970 | United Kingdom | 411/342 |

*Primary Examiner*—Gary L. Smith
*Assistant Examiner*—Adrian H. Whitcomb, Jr.
*Attorney, Agent, or Firm*—Michael Ebert

[57] ABSTRACT

A non-rotating toggle bolt assembly which includes a collapsible toggle threadably received on the shank end of a bolt whose length is greater than the thickness of the wall for which the assembly is intended. When the toggle is collapsed, it assumes reduced dimensions to permit its passage through a hole drilled in the wall. On emerging from the hole at the shank end of the bolt, the toggle which is now displaced from the inner surface of the wall, resumes its normal dimensions. The assembly is provided with means which act to prevent rotation of the toggle when, in the course of installation, the operator turns the bolt to advance the toggle on the shank into engagement with the inner surface of the wall to fasten the assembly thereon.

5 Claims, 13 Drawing Figures

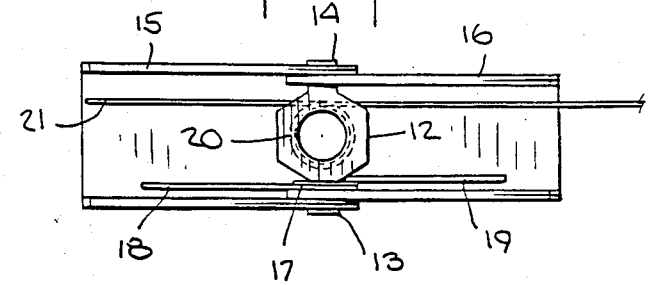
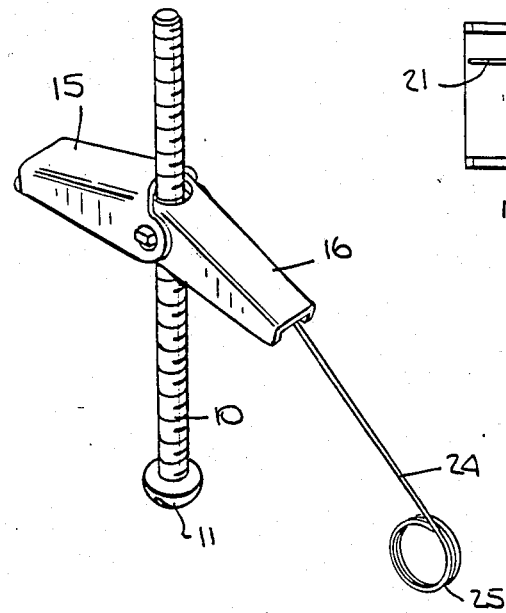
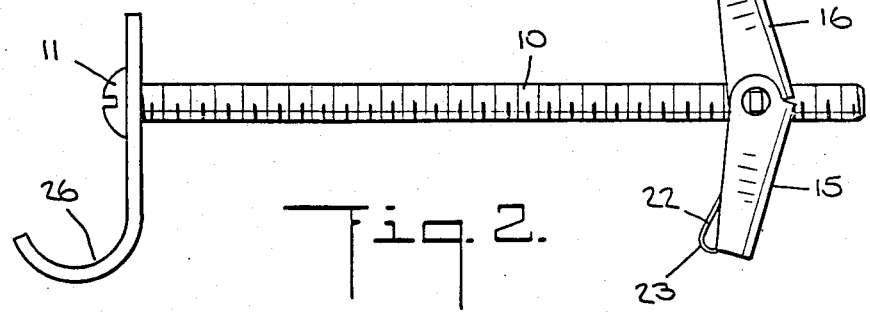
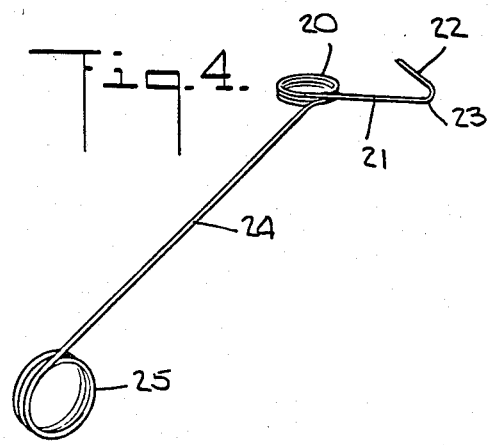
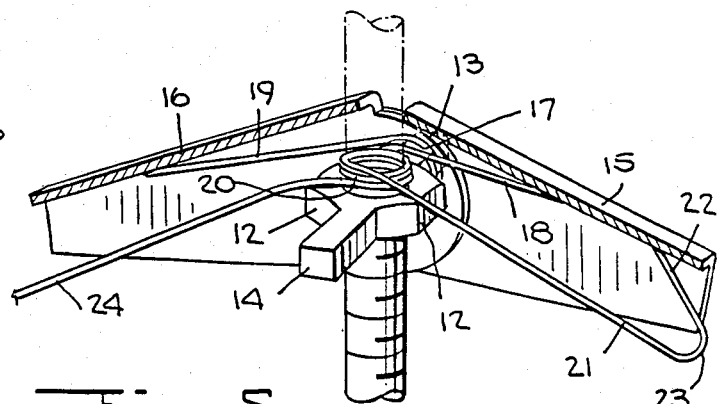

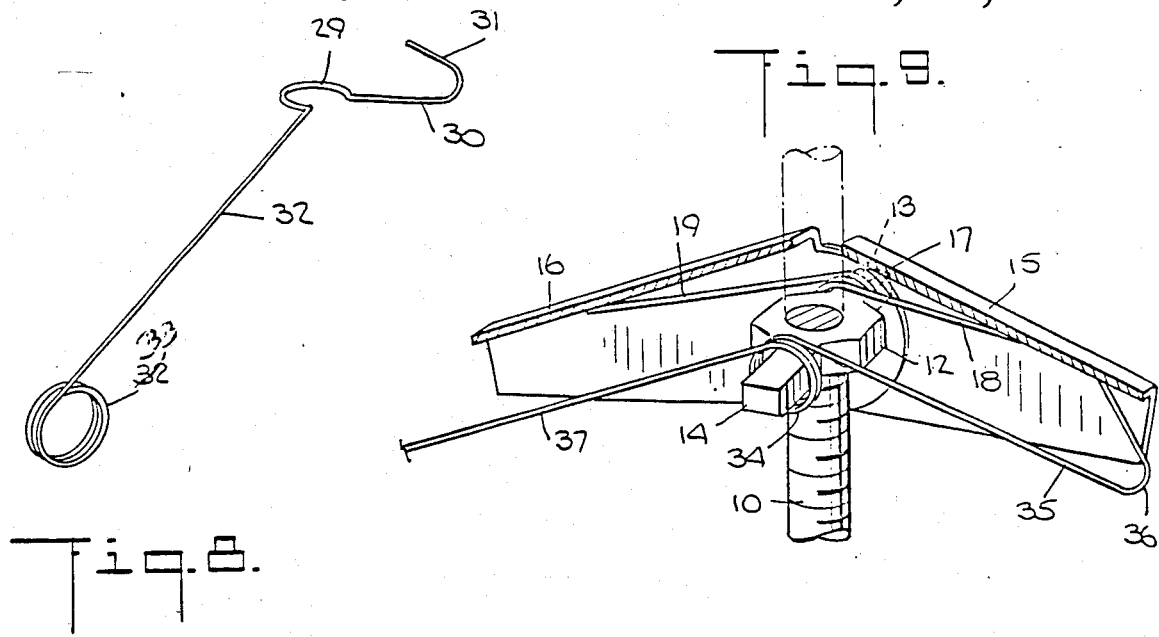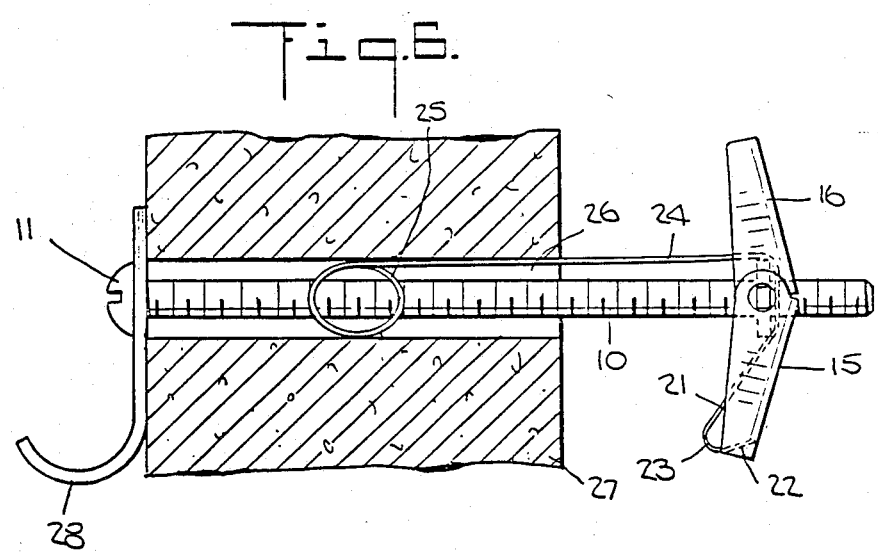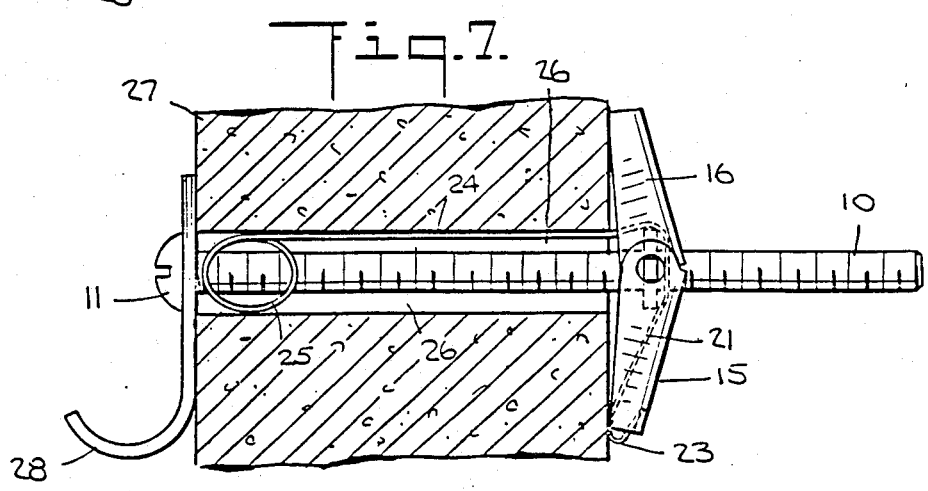

NON-ROTATING TOGGLE BOLT ASSEMBLY

RELATED APPLICATION

This application is a continuation-in-part of my copending application Ser. No. 635,068, filed July 27, 1984, now U.S. Pat. No. 4,616,968, bearing the same title, the entire disclosure of this copending application being incorporated herein by reference.

BACKGROUND OF INVENTION

1. Field of Invention

This invention relates generally to blind fasteners of the toggle bolt type which are insertable in a hole drilled in a hollow wall, and more particularly to a toggle bolt assembly including means that act to prevent rotation of the toggle in the course of installation when the bolt is turned to axially advance the toggle into engagement with the inner surface of the wall to fasten the assembly thereon.

2. Prior Art

Blind fasteners of the toggle bolt type are commonly used to secure fixtures and other objects against the outer surface of a hollow wall formed of masonry, tile, cinder block, plaster or fiber board, or any other plate or panel capable of supporting a load.

Webster's Third New International Dictionary defines a toggle as "a piece or device for holding or securing." As used herein, the term "toggle bolt" refers to a blind fastener having a collapsible toggle threadably received on the shank of a bolt whereby when the bolt is passed through a hole in a wall, the toggle is then collapsed to permit such passage; and when emerging from the hole, the toggle resumes its non-collapsed form to effect a fastening action. By a collapsible toggle is meant any holding element that is foldable, bendable, compressible or otherwise changeable to assume in the collapsed state reduced dimensions to permit its passage through a hole.

The most commonly known toggle bolt consists of a threaded bolt or screw on which is received a nut provided with opposed lugs or trunnions to pivotally support a pair of spring-biased wings. The wings, which are normally outstretched, fold in against the bolt when it is inserted in a drilled hole in the wall, the hole diameter being large enough to accommodate the folded-in wings. Toggle bolts of this conventional type are available in various sizes and weights, depending on the loads they are intended to support on a wall.

When installing a conventional toggle bolt in a hollow wall to hold a fixture or other object against its outer surface, a hole is first drilled in the wall, the diameter of the hole depending on the gauge of the toggle bolt. The toggle bolt assembly is inserted through a mounting hole in the fixture and pushed into the wall hole, the wings folding in to permit such entry. The length of the bolt is greater than the combined thickness of the fixture, the wall and the folded-in toggle wings. Hence, the wings pivoted on the nut, which is initially near the end of the bolt, resume their outstretched state when the bolt is fully inserted. The outstretched wings are thus displaced a substantial distance from the inner surface of the wall. The extent of this displacement depends on the length of the bolt relative to said combined thickness.

It is not at this point possible to tighten the wall-inserted toggle bolt; for should one turn the screw with a screw driver, the wings, which are free, will also turn and the trunnion nut will not advance on the screw toward the inner surface of the wall. In order, therefore, to effect tightening with a conventional toggle bolt, the installer must pull the fixture away from the wall to cause the outstretched wings to engage the inner surface of the wall and thereby resist a turning action. In this way, the screw can be turned with a screw driver without at the same time turning the wings, and the nut will then advance on the screw to effect tightening of the toggle bolt.

In practice, the need to manually pull the fixture away from the wall in order to tighten the toggle bolt will in many instances present serious difficulties. For example, if panels of insulation material are to be fastened to a hollow roof by means of roofing plates, the installer for each such plate must insert the toggle bolt through a mounting hole in the plate and thread the screw into the trunnion nut. A hole in the insulation panel and a hole in the roof are then made. The screw carrying the toggle wings is inserted through the panel and roof holes; and the wings then assume their outstretched state at a position displaced from the inner surface of the roof.

In order to now tighten the anchor bolt, the installer must place his fingers beneath the roofing plate so as to pull the roofing plate away from the insulation panel lying on the roof until the wings then engage the inner surface of the roof, thereby preventing rotation of the wings to permit tightening of the toggle bolt.

Most professional installers now use electric screw drivers which to be rendered operative must be pressed against the head of the screw. This presents no difficulty when the screw head lies against a stable substrate. But if the head of the screw lies against a roofing plate being held in one hand by the installer while his other hand holds the electric screw driver, the inherent instability of the situation makes installations very difficult and dangerous.

One must bear in mind that a professional installer is required in the case of a typical roof installation to put in thousands of toggle bolts, and that with conventional toggle bolts, the need to pull up the roofing plate in order to tighten the bolt not only adds significantly to the time it takes to make the installation, but also increases the risk of crushed fingers or other mishap.

Moreover, in a roof installation in which the insulation panels are secured by toggle bolts, the toggle bolts are vertically disposed; and since the exposed roof is subject to vibratory and compressive forces, this causes the toggle wings to actually unscrew to a point where the wings will fall off the screw, thereby leaving the insulation panels unsecured. As a consequence, the panels may be blown off the roof in a high wind producing a strong updraft.

The following patents which deal with various forms of toggle bolts are of background interest:
 Pleister—U.S. Pat. No. 2,061,634
 Gelpcke—U.S. Pat. No. 2,398,220
 Shamah—U.S. Pat. No. 4,286,497
 Apelzweig—U.S. Pat. No. 2,998,743
 Gelpcke—U.S. Pat. No. 2,567,372
 Zifferer—U.S. Pat. No. 1,228,512
 Goewey—U.S. Pat. No. 1,373,188
 Brenizer—U.S. Pat. No. 1,600,034
 Karitzky—U.S. Pat. No. 2,616,327
 Topf—U.S. Pat. No. 3,302,508
 Vaillancourt—U.S. Pat. No. 3,389,631

Forsberg—U.S. Pat. No. 3,513,746
Roberson—U.S. Pat. No. 4,079,655
Shamah—U.S. Pat. No. 4,286,497
Schrandolph—No. 1,237,386 (Fed. Rep. Ger.)

SUMMARY OF INVENTION

In view of the foregoing, the main object of this invention is to provide a non-rotating toggle bolt assembly adapted to fasten a fixture or other object to a hollow wall, which assembly, after insertion in a hole drilled in the wall, may be tightened by a torque tool, such as a screw driver, without the need to pull the fixture away from the wall, thereby making the installation procedure faster and safer. The term "wall" as used herein is intended to include any form of panel, plate or other drillable substrate on which an object is to be fastened.

More specifically, an object of the invention is to provide a toggle bolt assembly that includes locking means that act to prevent rotation of the toggle in the course of installation when the bolt or screw is turned in to advance the toggle to tighten the anchor bolt on the wall, and which also later act to prevent vibration from loosening the assembly after such installation.

Still another object of the invention is to provide a toggle bolt assembly whose locking means, which may be fabricated of resilient metal or plastic material, are easily combined with the standard elements of a toggle whereby the resultant assembly is not significantly more costly to manufacture than a conventional assembly.

Briefly stated, these objects are attained in a non-rotating toggle bolt assembly which includes a collapsible toggle threadably received on the shank end of a bolt whose length is greater than the thickness of the wall for which the assembly is intended. When the toggle is collapsed, it assumes reduced dimensions to permit its passage through a hole drilled in the wall. On emerging from the hole at the shank end of the bolt, the toggle which is now displaced from the inner surface of the wall, resumes its normal dimensions. The assembly is provided with means which act to prevent rotation of the toggle when, in the course of installation, the operator turns the bolt to advance the toggle on the shank into engagement with the inner surface of the wall to fasten the assembly thereon.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a first preferred embodiment of a non-rotating toggle bolt assembly in accordance with the invention;

FIG. 2 is an elevational view showing the assembly and a fixture to be fastened thereby;

FIG. 3 is a bottom view of the spring-biased wings pivoted on the trunnion nut;

FIG. 4 is a separate view of the locking spring;

FIG. 5 shows the relationship of the locking spring to the biasing spring;

FIG. 6 shows how the assembly is pushed into the wall hole;

FIG. 7 shows how the assembly in the hole is tightened;

FIG. 8 shows a modified form of the locking spring;

FIG. 9 shows another modified assembly;

DETAILED DESCRIPTION

First Embodiment

Figure 10:
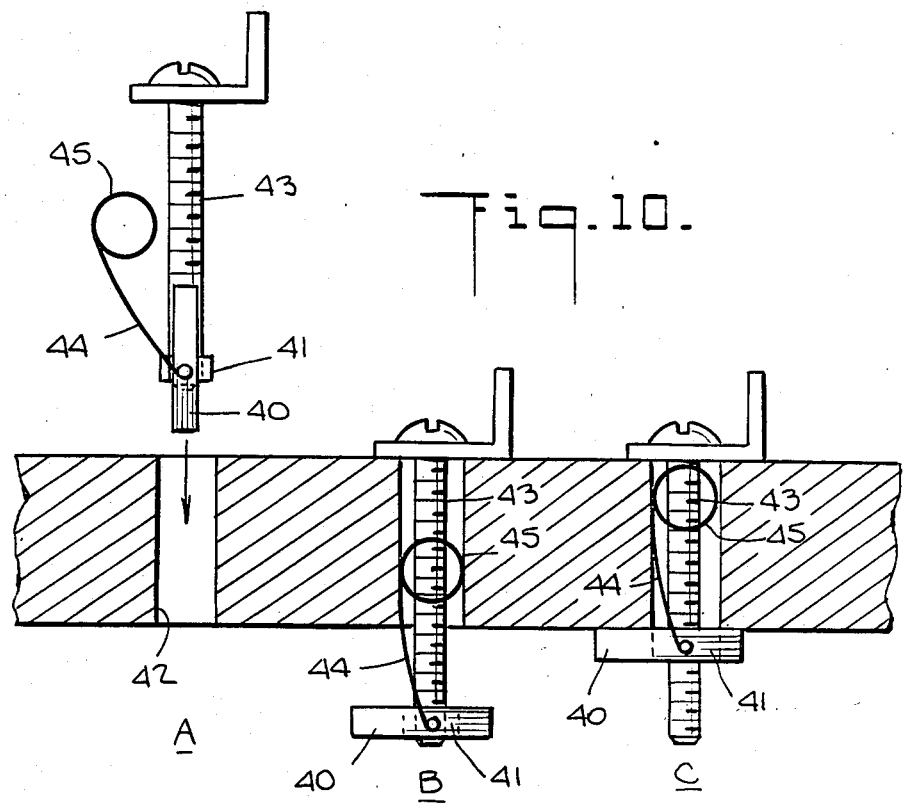
FIG. 10 shows a second embodiment of an assembly in accordance with the invention, the figure being divided into operating phases A, B and C.

In FIGS. 1 to 5, there is shown a non-rotating toggle bolt assembly according to the invention, including a threaded bolt or screw 10 having a slotted head 11 adapted to receive the blade of a screw driver. The head may be in other forms to accommodate a torque tool. The length of the screw shank exceeds the thickness of the hollow wall for which the toggle bolt is intended. Threadably received on the end of the screw shank is a nut 12 provided with oppositely-projecting lugs 13 and 14. These form trunnion to pivotally support inner and outer foldable wings 15 and 16, the inner wing folding into the outer wing.

Wings 15 and 16 have a channel-shaped cross section and are provided at their adjacent edges with complementary arcuate cut-outs to define an opening to admit the shank of the screw. These cut-outs form a pair of shoulder abutments that limit the extent to which the wings may be folded out.

As shown in FIG. 3, encircling trunnion 13 is the coil 17 of a biasing spring whose straight wire ends 18 and 19 extend under wings 15 and 16, respectively, and act to normally maintain the wings in an outstretched state. The wings are foldable in toward screw 10 against the tension of the biasing spring; and when the folded-in wings are released, they spring out to resume their normal outstretched state.

Also included is a locking means in the form of a mounting coil 20 of spring wire placed between nut 12 and the screw opening in wings 15 and 16, the diameter of the coil being slightly larger than that of the screw to permit it to pass through this coil.

Extending from one end of mounting coil 20 is a short wire tail 21 which runs under wing 15 and terminates in a compressible crook 22. Crook 22 has a peak 23 which projects from the rear of the wing in the direction of the inner surface of the wall. This curved bend or crook whose tip lies against the base of wing 15 functions as one operative component of the locking means associated with the toggle bolt assembly.

Extending from the other end of mounting coil 20 is a long wire tail 24 which runs under wing 16 and well therebeyond to terminate in a compressible loop 25, which may have more than one turn. This loop acts as the second operative component of the locking means. The locking spring may be fabricated of high strength metallic spring wire or synthetic plastic material having comparable properties. The wings, the screw and the wing-biasing spring may be made of the same metals commonly used in conventional toggle bolts and be fabricated in a range of sizes and weights, depending on the thickness of the walls for which they are intended as well as on the intended loads to be supported on these walls.

When the locking bolt assembly is to be installed by an operator in a hole 26 drilled in a hollow wall 27 of masonry or other wall material capable of supporting the intended load for this purpose of securing a load-holding fixture 28 or other object to the outer surface of the wall, in order to prepare for installation, the operator first passes the screw through the mounting hole in the fixture and then turns the trunnion nut onto the end of the screw shank. At this point, the arrangement is that shown in FIG. 2, where it will be seen that wings 15 and 16 and the long and short tails 21 and 24 are outstretched.

The operator then pushes the assembly through the drilled hole 26 in a hollow wall 27. This action causes the pivoted wings and the related tails to fold in to permit passage through the hole whose diameter is large enough to accommodate the assembly in the folded-in state. Hence before the wings emerge from the hole in the wall, both tails are also disposed within the hold.

When, however, as shown in FIG. 6, the wings emerge from the drilled hole 26 and pivot to resume their normal outstretched state, and the screw is then fully inserted so that now fixture 28 lies against the outer surface of wall 27, the wings are then well displaced from the inner surface of the wall. The short tail 21 is then also outside of the hole and lies under the inner wing 15. But the long tail 24 and its compressible end loop 25, because of the length of this tail, does not exit from the hole. The diameter of loop 25 is somewhat greater than that of the hole and is therefore compressed thereby to provide a tail restraining force.

In practice, loop 25 of the long. tail may encircle screw 10 or lie outside the screw, but in both cases, the screw and the loop are disposed within the masonry hole.

When, therefore, the operator using a screw driver now turns screw 10, the trunnion nut 12 and the wings 15 and 16, which are prevented from rotating by reason of the locking action of the long tail, advance axially on the screw toward the inner surface of hollow wall 27. As shown in FIG. 7, the wings then approach engagement with this wall surface. The operator continues to turn the screw to tighten the assembly, and in doing so, the peak 23 of the crook 22 on short tail 21 which engages the inner wall surface is subjected to pressure which deforms the crook to produce an off-center locking force on the wings which prevents the wings and the screw from subsequently turning as a result of vibratory or other forces imposed on the wall which would otherwise tend to loosen the assembly.

Thus the locking spring has a dual function; for it not only serves to prevent turning of the wings when the screw is turned by the operator, thereby doing away with the need during the installation procedure to pull the fixture away from the wall as in prior art toggle bolts, but it also serves to prevent subsequent unscrewing of the screw or the wings and the consequent loosening of the installed assembly.

Modifications

In the locking spring in FIG. 8, instead of a mounting coil as in FIG. 4, through which the screw is admitted to retain the spring on the sub-assembly, use may be made of a half loop 29 for this purpose. A short tail 30 extends from one end of the half-loop, terminating in a compressible crook 31, and a long tail 32 extends from the other end, terminating in a compressible loop 33.

But whether the locking spring is of the type shown in FIG. 4 or in FIG. 8, this element has to be added to the wing subassembly after screw 10 is inserted in the mounting hole of the fixture. The operator is then required to place the mounting coil or the half loop of the locking spring at a position overlying the wing nut intermediate the nut and the opening between the wings so that the screw can be advanced therethrough, as shown in FIG. 5.

In the form of locking spring shown in FIG. 9, the coil 34 is adapted to fit into trunnion 14 of the nut 12 whose other trunnion 13 carries the mounting coil 17 of the wing-biasing spring. Thus, the locking spring becomes a part of the wing sub-assembly and does not have to be added thereto prior to installation of the assembly in a drilled hole. Extending from one end of coil 34 is a short tail 35 terminating in a compressible crook 36. Extending from the other end of coil 34 is a long tail 37, terminating in a compressible coil which acts to retain this tail in the hole.

One may dispense with the short tail and its function, and provide a rotation preventing means in the form of a resilient plastic tail of flat ribbon material having an eye at one end to couple the tail onto the screw between the trunnion nut and the wings, and having at the other end a compressible ring or bend, whose function is the same as the long tail previously described.

One can also modify the existing wing-biasing spring on a standard wing-type toggle bolt so that the end of the wire of the spring which lies under one wing is formed into a compressible crook serving a function similar to the short tail previously described to prevent loosening of the installed toggle as a result of vibration. In this way, one does away with the need for a separate short tail.

Second Embodiment

The invention is also applicable to toggle bolts of the so-called "tumble" type, as shown in FIG. 10, in which the gravity-operated toggle is constituted by a single wing member 40 pivoted off-center on a trunnion nut 41. As shown in phase A of FIG. 10, before being inserted in hole 42 in the wall, toggle 40 is swung so that it lies parallel to the shank 43 of the screw and thereby collapsed to permit its passage through the hole.

When toggle 40 emerges from the hole, gravity causes the off-center toggle to swing into its normal position at right angles to the shank, in which position its long dimension is much greater than the diameter of the hole. This is the uncollapsed state of the toggle. In order to prevent rotation of the toggle when the screw is turned to axially advance the toggle toward the inner surface of the wall, a long tail 44 is attached to the toggle, the tail terminating in a restraining element 45.

Thus, as shown in phase B of FIG. 10, after insertion of the assembly, the toggle is well displaced from the inner surface of the wall, whereas restraining element 45 lies within the hole 42 to prevent rotation of the toggle as the bolt is turned to advance the toggle toward the inner surface of the wall until the wall is engaged thereby, as shown in phase C. While a flexible wire tail is shown which is coiled to form the restraining element, this may be in the form of a thin plastic band.

Third Embodiment

Figure 11:
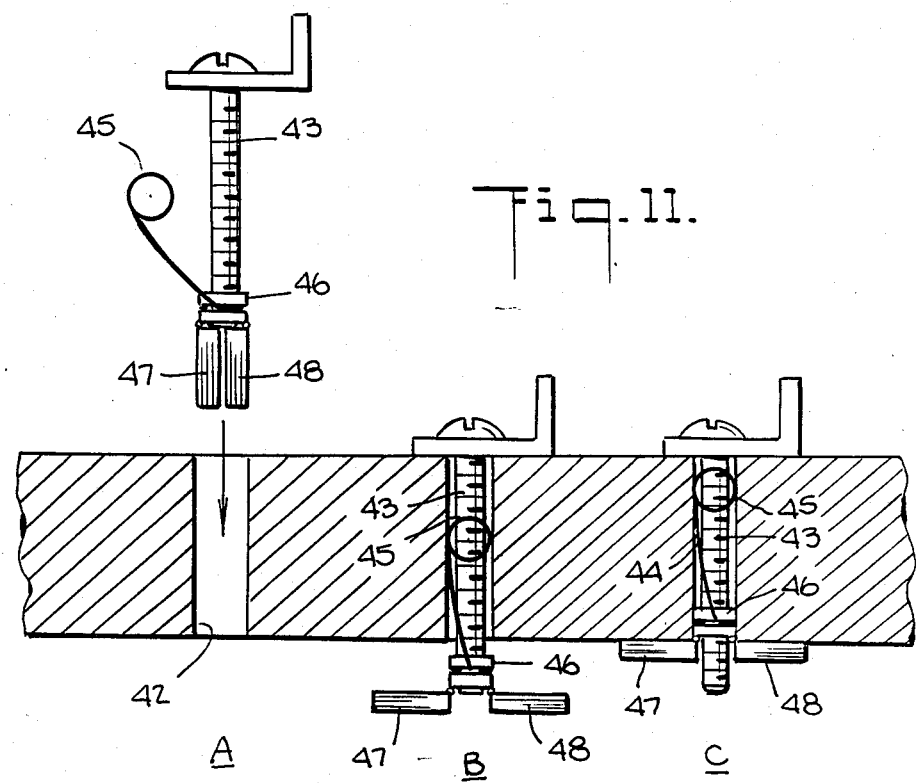
FIG. 11 shows a third such embodiment.

In this embodiment, as shown in FIG. 11, phases A, B and C, the toggle is constituted by a nut 46 thteadably received on the end of bolt shank 43, the nut having pivoted on opposite sides thereof of a pair of arms 47 and 48. In phase A of FIG. 11, since nut 45 is at the end of bolt shank 43, the arms may be folded down and thereby collapsed to permit passage of the toggle through hole 42 in the wall.

In practice, the nut and arms pivoted thereon may be formed of metal and therefore require pivot pins. But the nut and arms may be integrated in a unitary plastic structure, in which case the arms are joined to the nut by living hinges. As in the second embodiment, rotation of the toggle is prevented by a tail 44 attached at one end to the toggle and terminating at its other end in a restraining element 45.

When the toggle advanced on the shank toward the inner surface of the wall as shown in phases B and C in FIG. 11, the shank then is interposed between the pivoted arms 47 and 48 and forces them outwardly. The arms in this outstretched state engage the inner surface of the wall to fasten the assembly thereon.

Fourth Embodiment

Figure 12:
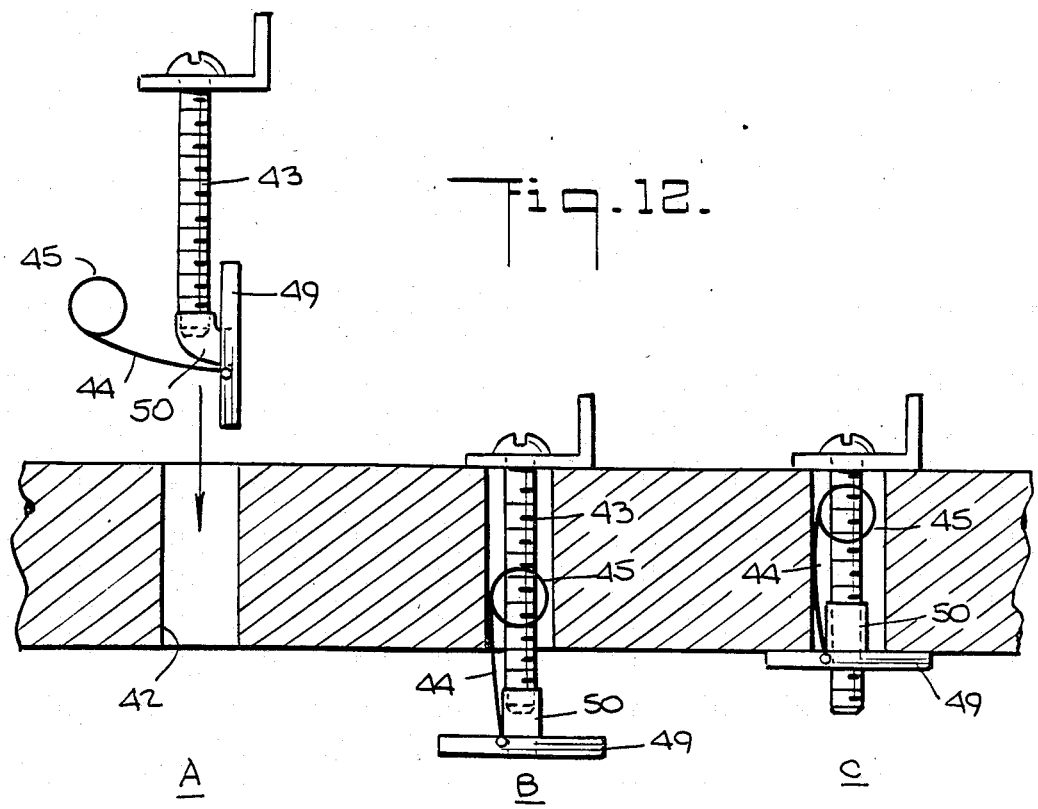
FIG. 12 shows a fourth embodiment.

As shown in phases A, B and C of FIG. 12, in this embodiment, the toggle is constituted by a steel bar 49 having a threaded hole at its midpoint so that the toggle bar functions as a nut. The bar is received on a flexible plastic cylindrical connector 50 which is joined to the end of shank 43 of the bolt and has the same diameter. As the bolt is turned by a tool, the bar is prevented from rotating while it threads its way on the connector and then advances on the shank.

The bar and the connector together constitute a collapsible toggle; for, as shown in phase A, connector 50 is bendable to position bar 49 in parallel with shank 43 to permit passage of the shank and bar through hole 42 in the wall. When the bar emerges from the hole, the flexible connector, because of its plastic memory, resumes its normal axial position and the bar is then at right angles thereto, as shown in phase B.

In order to prevent rotation of this toggle, one end of tail 44 is connected to bar 49, the restraining element 45 at the trailing end of the tail remaining in the hole and acting to prevent rotation of the bar as it advances toward the inner surface of the wall into engagement therewith, as shown in phase C.

In practice, the bar need not be of steel, but may be made of another metal or of a high strength plastic material. The inner surface of the bar may be provided with serrations or teeth to grip the inner surface of the wall and thereby prevent loosening of the installed bar as a result of biratory forces. Such teeth may also be provided on the inner surface of the arms shown in FIG. 11 or on the toggle shown in FIG. 10.

Fifth Embodiment

Figure 13:
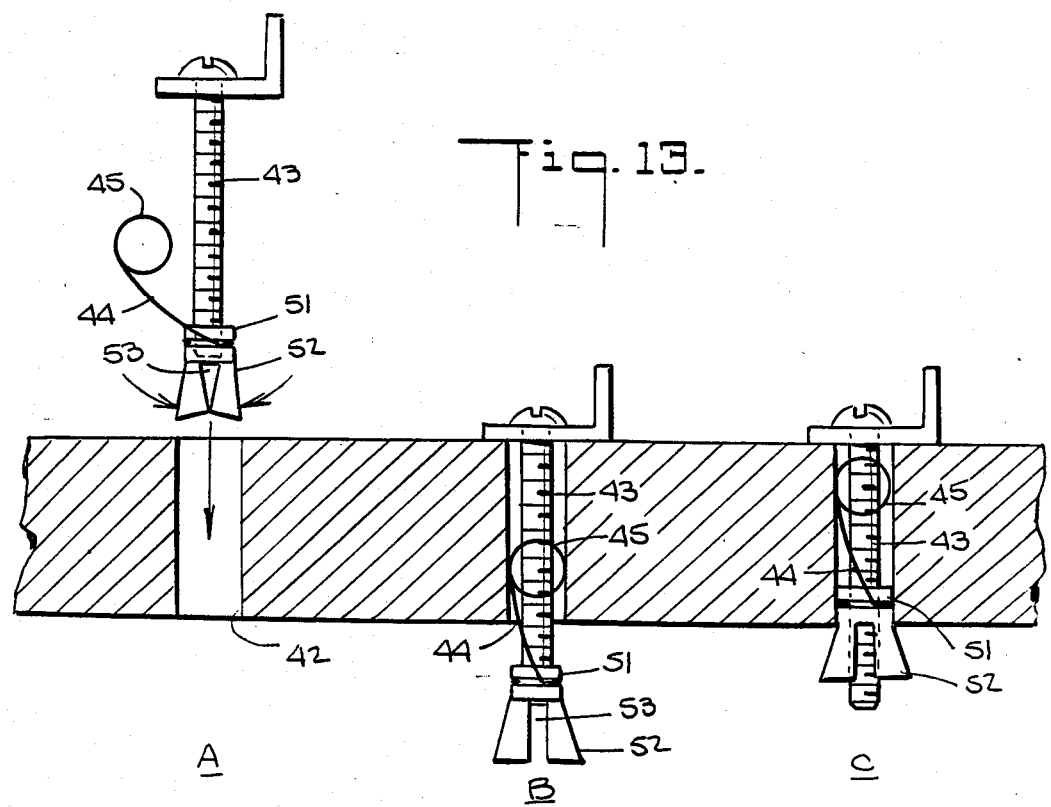
FIG. 13 shows a fifth embodiment.

In the toggle bolt assembly shown in phases A, B and C of FIG. 13, the one-piece toggle is in the form of a nut 51 threadably received on the end of shank 43 of the bolt and a truncated conical extension 52 integral therewith having a diametrical slot 53 to permit passage of the shank through the extension.

This toggle is formed of resilient plastic material, making it possible to compress the conical extension 52 to reduce its dimensions so that it can be pushed through hole 42 in the wall, as indicated by the arrows in phase A. When the toggle emerges from the hole, as shown in phase B, it resumes its uncompressed state. Since the wall thickness is not usually known, the length of the bolt must be such to ensure that the toggle will emerge from a thick wall.

And when the bolt is turned, the toggle advances axially on the shank, the shank 43 then extending through slot 53, as shown in phase C, so that the conical extension is no longer compressible. Hence, when the conical extension engages the inner surface of the wall, any further advance of the toggle on the shank as the bolt is turned produces a wedging action which acts to fasten the assembly on the wall.

To prevent rotation of the toggle as the bolt is turned, one end of the tail 44 is connected to the toggle, the restraining element 45 at the trailing end of the tail remaining in the hole as in the previous embodiments.

Thus, in all of the embodiments disclosed herein, the toggle, regardless of its form, is collapsible to assume reduced dimensions permitting it passage in the hole, the toggle resuming its normal dimensions when emerging from the hole.

While there has been shown and described a preferred embodiment of a NON-ROTATING TOGGLE BOLT ASSEMBLY, it will be appreciated that many changes and modifications may be made therein without, however, departing from the essential spirit thereof.

I claim:

1. A non-rotating toggle bolt assembly for supporting a fixture or other object against the outer surface of a hollow wall, said assembly comprising:

A. a bolt having turning means at one end to effect turning thereof, and a threaded shank whose length exceeds the thickness of the wall for which it is intended;

B. a collapsible toggle threadably received on the end of the shank, said toggle when in the collapsed state assuming reduced dimensions permitting its passage through the hole, the toggle when emerging from the hole resuming its normal dimensions; and C. locking means to prevent rotation of the toggle, whereby when said bolt is turned, the toggle will then advance along the shank toward the inner surface of the wall to engage said inner surface, said locking means being constituted by a long tail coupled at one end to the toggle and terminating in a restraining element, the length of the long tail being such that in the course of installation when the toggle is collapsed to pass through the hole, the long tail also passes therethrough, the restraining element is substantially closer to the turning means than the toggle is to the turning means such that the restraining element does not emerge from the hole when the toggle, after emerging from the hole, resumes its normal dimensions, whereby the restraining element prevents rotation of the toggle.

2. An assembly as set forth in claim 1, wherein said collapsible toggle is constituted by a trunnion nut threadably received on the shank and a single wing member pivoted off center of the nut, so that by folding the wing member against the shank the toggle is collapsed.

3. An assembly as set forth in claim 1, wherein said toggle is constituted by a nut threadably received on the shank and a pair of arms hinged on opposite sides of the nut, whereby in the collapsed state the arms are folded down.

4. An assembly as set forth in claim 1, wherein said toggle is constituted by a nut threadably received on the shank and having a pair of arms extending from opposite sides of the nut to form a rigid bar, and said shank is provided at its end with a bendable extension whereby in the collapsed state, said bar may be folded to lie parallel to the shank.

5. An assembly as set forth in claim 1, wherein said toggle is constituted by a nut threadably received on the shank, said nut having a conical extension which is slotted to render it compressible for insertion in the hole.

* * * * *